Nov. 8, 1932.  S. J. PEHRSSON  1,887,067
PIANO TRUCK
Filed Oct. 2, 1929   2 Sheets-Sheet 1

Inventor
Sven Johan Pehrsson
By Slough and Canfield
Attorney

Nov. 8, 1932.  S. J. PEHRSSON  1,887,067
PIANO TRUCK
Filed Oct. 2, 1929  2 Sheets-Sheet 2
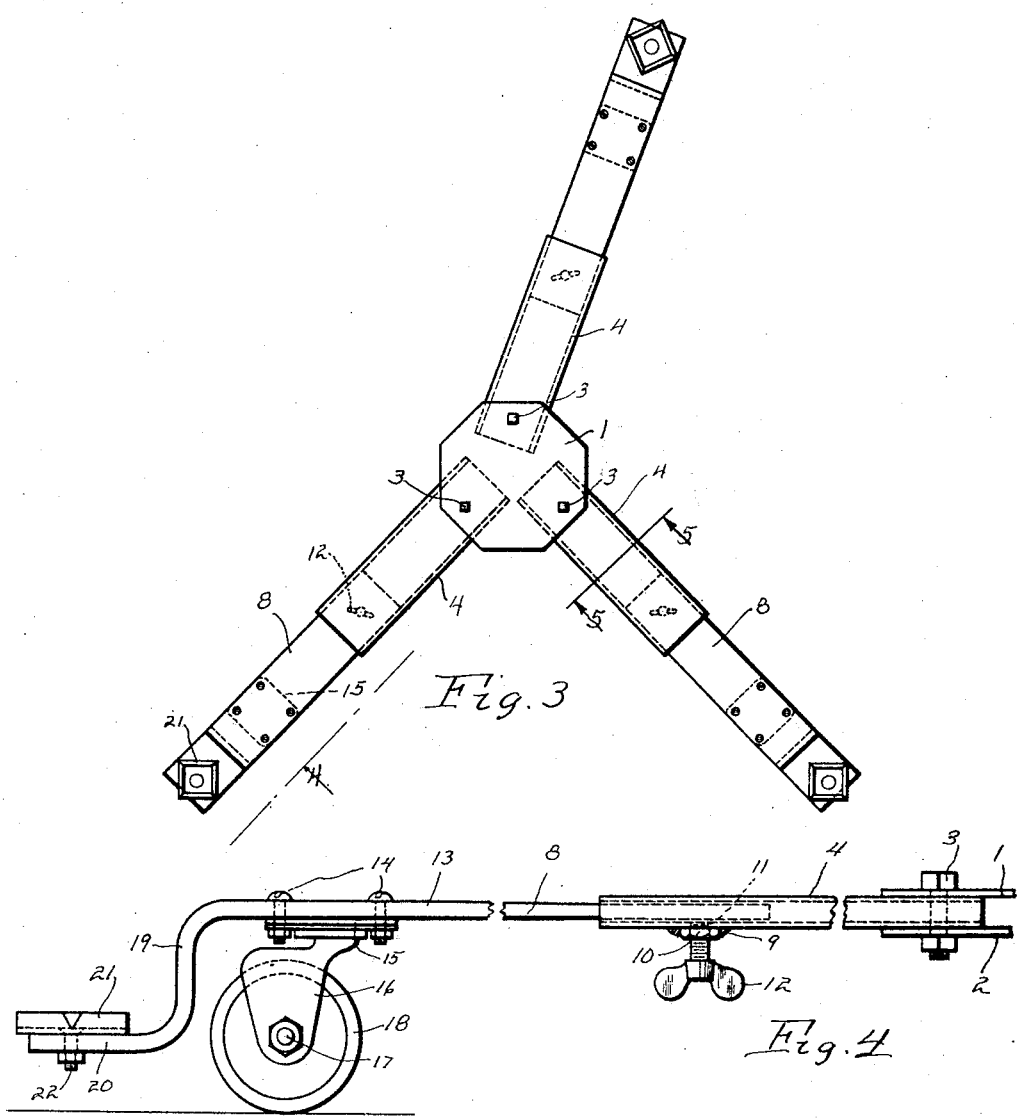
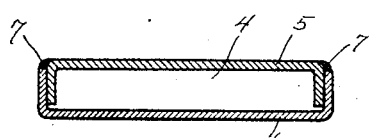

Patented Nov. 8, 1932

1,887,067

UNITED STATES PATENT OFFICE

SVEN JOHAN PEHRSSON, OF ELYRIA, OHIO, ASSIGNOR TO THE COLSON COMPANY, OF ELYRIA, OHIO, A CORPORATION OF OHIO

PIANO TRUCK

Application filed October 2, 1929. Serial No. 396,680.

This invention relates to adjustable trucks and particularly to adjustable trucks for pianos.

One of the objects of this invention is to provide a truck upon which a piano may be placed for moving it to and from its place of use as on the stage of a theater or the like.

Another object is to provide a truck of the class described which may be easily adjusted to adapt it to the dimensions and to the floor plan of the piano with which it is to be used.

Another object is to provide a truck of the class described having wheels or casters for rolling it and/or the piano thereon and in which the wheels or casters may be of relatively large diameter to render the movement of the truck and piano easy and at the same time requires that the piano be lifted only a small distance from the floor to position it on the truck.

Another object is to provide a truck of the class described adapted for use with relatively large wheels or casters, but constructed so that the piano, when in position thereon, is elevated a very small distance above its normal position relative to the floor whereby the height of the key board of the piano in relation to the performer is increased by a negligible amount.

Another object is to provide a piano truck which will be simple and cheap to manufacture and which will be easy to adjust to pianos of different sizes and shapes, simple in operation and rigid and durable in use.

Other objects will be apparent to those skilled in the art to which my invention pertains.

My invention is fully disclosed in the following description taken in connection with the accompanying drawings, in which:—

Fig. 3 is a plan view from above of the truck of my invention;

Fig. 4 is a side elevational view, drawn to a larger scale, of a part of the truck and taken approximately from the plane 4 of Fig. 3;

Fig. 5 is a cross-sectional view taken from the plane 5 of Fig. 3 with parts beyond the sectional plane omitted.

Figure 1:
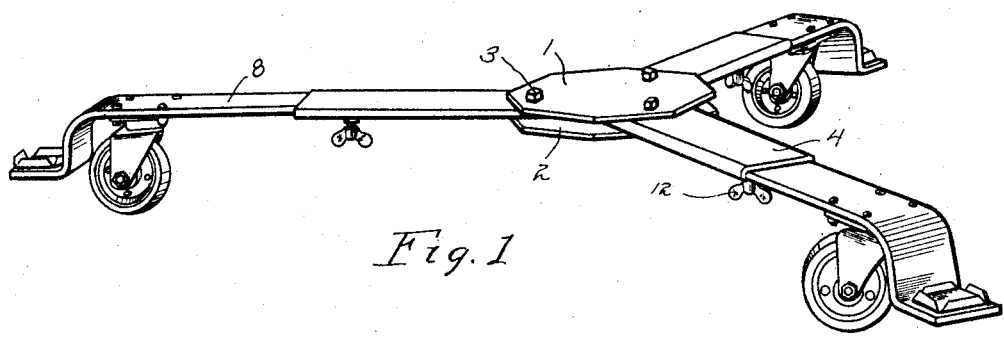
Fig. 1 is a perspective view of the truck of my invention.

Referring to the drawings, I have shown at 1 and 2 upper and lower heads made from metal plate, preferably planar for simplicity, and of hexagonal, circular, triangular or other desired peripheral form.

The heads 1 and 2 are perforated with registering holes to receive through bolts 3 with the heads thereof on the plate 1 and nuts on the plate 2.

Between the heads 1 and 2 are a plurality, preferably three, tubular telescoping elements 4, preferably of greater horizontal than vertical dimension, as illustrated in Fig. 5. The elements 4 are preferably made by telescoping together upper and lower channel shaped members 5 and 6 preferably of metal welded together, as at 7, Fig. 5.

One end of the flat tubular member thus formed is inserted between the heads 1 and 2 and pivoted on the bolts 3. Into the other end of each tubular element is inserted a preferably solid telescoping element 8 of rectangular cross section, and of such dimensions as to slidably fit the interior of the element 4, to be more fully described.

Adjacent the outer end of each of the telescoping elements 4 and on the under side thereof is welded as at 9 a nut 10 and registering with the hole of the nut is a perforation 11 in the lower side of the telescoping element 4.

A threaded wing nut 12 is screwed into the nut 10 and the threaded portion passes on through the perforation 11 into the interior of the telescoping element 4 and engages the lower side of the telescoping element 8 and, by tightening the wing nut 12, the two telescoping elements 4 and 8 may be rigidly bound or wedged together.

It will thus be apparent that the telescoping element 8 may be moved inwardly or outwardly in the telescoping element 4 and fixed in any position for a purpose to be described, and at the same time, the two telescoping elements 4 and 8 may be together revolved around the respective bolt 3.

The telescoping element 8 beyond the telescoping element 4 has a substantially straight horizontal portion 13 on the underside of which is secured, as by bolts 14, the head 15 and yoke 16 of a wheel 18 having a rotational bearing 17.

The wheel construction is preferably of the caster type and is so illustrated. Beyond the wheel 18, the telescoping element 8 bends downwardly as at 19 and terminates in a horizontal foot 20, which as shown in Fig. 4 may be only slightly elevated from the floor regardless of the height of the wheel 18 and its mounting.

On the foot 20 is mounted a receptacle 21, which in the form illustrated is cup shaped, formed from a substantially rectangular piece of sheet metal, the four edges of which are upturned to form the cup.

The receptacle 21 is secured to the foot 20 by a bolt 22 passing downwardly through the center of the cup-like receptacle and on through the foot 20.

Figure 2:
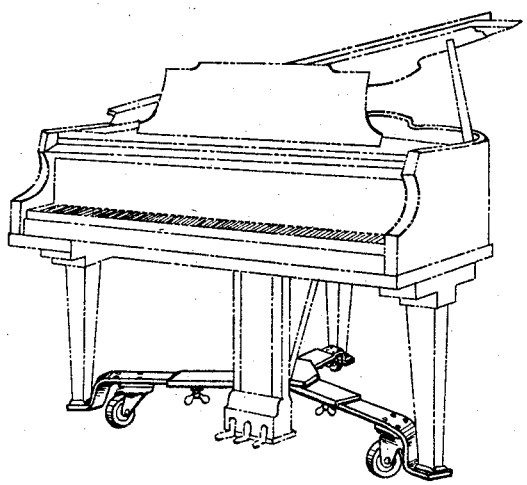
Fig. 2 is a perspective view of the truck of Fig. 1 drawn to a smaller scale and indicating a piano mounted thereon as in use.

The receptacle 21 is illustrated as of rectangular form to correspond to the rectangular shape of the lower end of the legs of a piano, such as that illustrated in Fig. 2, but the cup may be of other shapes as will be apparent, and in any case, the receptacle 21 may be adjustably rotated around the bolt 22 by loosening the latter to accommodate it to the piano leg which is to be rested therein.

In the operation of my invention, by rotating the telescoping elements around their pivot bolts 3 and by adjustably telescoping the elements by loosening the bolts 12, the receptacles 21 may be suitably positioned to receive the three legs of a piano whatever the size of the piano may be, and whatever the floor pattern of its legs or the feet thereof.

The piano may be lifted and placed with its feet in the receptacles 21 and by tightening the wing nuts 12, the entire structure is made rigid and the piano may be safely shoved about upon the floor.

The receptacles 21 are, as shown in the drawings, relatively close to the wheels 18, so that there is very little leverage by which the weight of the piano may rock the central portions of the truck upwardly around the wheels as fulcrums to distort the same.

This arrangement of parts also facilitates mounting the piano upon the truck, in many cases it being entirely feasible for the mover to raise one leg of the piano at a time and place it on its receptacle 21.

While I have shown and described my invention in connection with a piano of the grand type, it will be apparent that my invention is susceptible of modification to adapt it to four legged pianos.

As particularly shown in Fig. 4, it will be observed that the receptacle 21 may be very close to the floor so that the piano need be lifted only a small amount to place it on the truck and furthermore, when on the truck, the key board of the piano is elevated only a slight and negligible amount above its normal height from the floor and these advantages are obtained even with the use of large and therefore easy rolling wheels 18.

My invention is not limited to the exact details of construction shown and described, inasmuch as the advantages of my improved truck may be obtained with structures differing widely therefrom, and many changes and modifications may be made therein within the scope of my invention and without departing from the spirit thereof.

I claim:

1. In a wheeled truck for pianos, a central head, comprising upper and lower portions, a plurality of arms pivoted at spaced points to the head between said portions and extending laterally therefrom, the arms each comprising a telescoping internal element telescoped within a tubular element, means for locking the telescoping elements in telescopingly adjusted positions, a supporting wheel for each of the arms adapted to roll upon the floor, and each arm being provided with a piano supporting foot.

2. In a wheeled truck for pianos, a central head, comprising upper and lower portions, a plurality of arms pivoted at spaced points to the head between said portions and extending laterally therefrom, the arms each comprising a telescoping internal element telescoped within a tubular element, means for locking the telescoping elements in telescopingly adjusted positions, a supporting wheel for each of the arms adapted to roll upon the floor, and each arm being provided with a piano supporting foot, positioned a less distance from the floor than the diameter of the wheel.

3. In a wheeled truck for pianos, a central head, comprising upper and lower portions, a plurality of arms pivoted at spaced points to the head between said portions and extending laterally therefrom, the arms each comprising a telescoping internal element telescoped within a tubular element, means for locking the telescoping elements in telescopingly adjusted positions, a supporting wheel for each of the arms adapted to roll upon the floor, and each arm being provided with a piano supporting foot, positioned a less distance from the floor than the diameter of the wheel and farther from the central head than the wheel.

4. In a wheeled truck for pianos, a central head, a plurality of arms, pivoted thereto and extending laterally therefrom, each arm comprising a tubular telescoping element pivoted to the head and of rectangular cross section of greater dimension horizontally than vertically, an internal solid telescoping element substantially filling the tubular element and slidable longitudinally therein, locking means for locking the internal and external telescoping elements in telescopingly adjusted positions, a supporting wheel adapted to rest upon the floor and having a bearing portion connected to and supporting the internal telescoping element, the internal telescoping element extending over the wheel and bent downwardly toward the floor beyond the wheel and then bent outwardly substantially parallel with the floor to provide a depending piano supporting foot at a less distance from the floor than the diameter of the wheel, and a receptacle on the foot for receiving the end of a piano leg.

5. In a wheeled truck for pianos, a central head, a plurality of arms, pivoted thereto and extending laterally therefrom, each arm comprising a tubular telescoping element pivoted to the head and of rectangular cross-section of greater dimension horizontally than vertically, an internal solid telescoping element substantially filling the tubular element and slidable longitudinally therein, locking means for locking the internal and external telescoping elements in telescopingly adjusted positions, a supporting wheel adapted to rest upon the floor and having a bearing portion connected to and supporting the internal telescoping element, the internal telescoping element extending over the wheel and bent downwardly toward the floor beyond the wheel and then bent outwardly substantially parallel with the floor to provide a depending piano supporting foot at a less distance from the floor than the diameter of the wheel, and a receptacle on the foot for receiving the end of a piano leg, the receptacle being formed to embrace the lower end of the piano leg and being adjustable on the foot around a vertical axis.

In testimony whereof I hereunto affix my signature this 6th day of September, 1929.

SVEN JOHAN PEHRSSON.